United States Patent
Adir et al.

(10) Patent No.: US 10,885,204 B2
(45) Date of Patent: Jan. 5, 2021

(54) METHOD AND SYSTEM FOR SEMANTIC PRESERVING LOCATION ENCRYPTION

(71) Applicant: International Business Machines Corporation, Armonk, NY (US)

(72) Inventors: Allon Adir, Kiryat Tivon (IL); Lev Greenberg, Haifa (IL); Omri Soceanu, Haifa (IL)

(73) Assignee: International Business Machines Corporation, Armonk, NY (US)

(*) Notice: Subject to any disclaimer, the term of this patent is extended or adjusted under 35 U.S.C. 154(b) by 214 days.

(21) Appl. No.: 16/029,608

(22) Filed: Jul. 8, 2018

(65) Prior Publication Data
US 2020/0012797 A1    Jan. 9, 2020

(51) Int. Cl.
*G06F 21/60* (2013.01)
*G06F 21/62* (2013.01)

(52) U.S. Cl.
CPC ........ *G06F 21/602* (2013.01); *G06F 21/6245* (2013.01)

(58) Field of Classification Search
CPC ............... G06F 21/602; G06F 21/6245; G06F 2221/2111
See application file for complete search history.

(56) References Cited

U.S. PATENT DOCUMENTS

| | | | |
|---|---|---|---|
| 7,864,952 B2 | 1/2011 | Pauker et al. | |
| 8,938,067 B2 | 1/2015 | Martin et al. | |
| 9,202,079 B2 | 12/2015 | Kaliski, Jr. | |
| 9,489,854 B2* | 11/2016 | Haruta | G09B 19/04 |
| 9,798,893 B2 | 10/2017 | Arnold et al. | |
| 2007/0073745 A1* | 3/2007 | Scott | G06F 16/374 |
| 2007/0086587 A1* | 4/2007 | Farahat | G06Q 10/107 |
| | | | 380/28 |
| 2011/0093465 A1* | 4/2011 | Sporer | G06Q 10/00 |
| | | | 707/737 |
| 2012/0017078 A1 | 1/2012 | Reno et al. | |
| 2014/0149070 A1* | 5/2014 | Cheng | G06K 9/00335 |
| | | | 702/150 |
| 2015/0278544 A1 | 10/2015 | Movshovitz | |
| 2015/0358159 A1 | 12/2015 | Rozenberg et al. | |
| 2017/0300737 A1* | 10/2017 | Wang | G06K 9/0063 |
| 2017/0316333 A1* | 11/2017 | Levinson | G06K 9/00805 |
| 2018/0246898 A1* | 8/2018 | White | G06Q 30/0631 |
| 2019/0103965 A1* | 4/2019 | Roake | G06F 21/602 |

(Continued)

OTHER PUBLICATIONS

Oh et al., "Point Transformation Scheme to protect location data changing in real time," MILCOM 2016—2016 IEEE Military Communications Conference Year: 2016 | Conference Paper | Publisher: IEEE.*

(Continued)

*Primary Examiner* — Roderick Tolentino
(74) *Attorney, Agent, or Firm* — Gregory J. Kirsch

(57) ABSTRACT

Embodiments of the present systems and methods may provide techniques for encryption of location information, while preserving a format and semantics of the information. For example, in an embodiment, a computer-implemented method for encrypting data may comprise receiving location data and generating encrypted data from the received location data, wherein the encrypted data preserves the format and semantics of the received location data.

20 Claims, 4 Drawing Sheets

(56) References Cited

U.S. PATENT DOCUMENTS

2019/0375514 A1* 12/2019 Lampazzi ............... G09G 5/38

OTHER PUBLICATIONS

Kachore et al., "Location Obfuscation for Location Data Privacy," 2015 IEEE World Congress on Services Year: 2015 | Conference Paper | Publisher: IEEE.*
Partridge et al., "Realizing a Virtual Private Network using Named Data Networking", ICN '17, Sep. 26-28, 2017, pp. 156-162, Berlin, Germany.
Ladi, "Semantics-Preserving Encryption for Computer Networking Related Data Types", AIS 2017, 12th International Symposium on Applied Informatics and Related Areas, Nov. 9, 2017, pp. 176-181, Székesfehérvár, Hungary.
Xu et al., "Prefix-Preserving IP Address Anonymization: Measurement-based Security Evaluation and a New Cryptography-based Scheme", Proceedings of the 10th IEEE International Conference on Network Protocols (ICNP'02), 2002.
Lee et al., "Protecting location privacy using location semantics", Proceedings of the 17th ACM SIGKDD international conference on Knowledge discovery and data mining, 2011, pp. 1289-1297.

* cited by examiner

METHOD AND SYSTEM FOR SEMANTIC PRESERVING LOCATION ENCRYPTION

BACKGROUND

The present invention relates to techniques for format and semantic preserving encryption of location information in order to protect privacy.

Under the General Data Protection Regulation (GDPR), an individual's location is considered private information and should be treated accordingly. Nevertheless, various systems still require some form of location to function properly. Generally, format preserving encryption (FPE) is used to encrypt location providing fields such as GPS data, coordinates and even IP addresses while preserving properties such as valid range and format. However, properties, for example, geo-location information and semantic information, such as whether the individual is in a city or the country side, are lost in the encryption process. Though geo-location is private as well, some individuals may consent to a certain degree of relaxation in anonymity demands. For example, an individual may restrict disclosing their own IP address while allowing an address from their current state. Whether it be at the neighborhood, city, or state level, or even just semantic information, such as population density in the area, it may be advantageous to organizations to retain some information, while at the same time providing the necessary privacy required by the users. In particular, by default, it should not be possible to identity a person from the obfuscated or encrypted data. However, the person may relax this restriction explicitly after being properly requested to do so with clear explanations.

Accordingly, a need arises for techniques that may provide encryption of location information, while preserving a format and semantics of the information.

SUMMARY

Embodiments of the present systems and methods may provide techniques for encryption of location information, while preserving a format and semantics of the information.

For example, in an embodiment, a computer-implemented method for encrypting data may comprise receiving location data and generating encrypted data from the received location data, wherein the encrypted data preserves the format and semantics of the received location data.

In embodiments, the received location data may comprise a first Internet Protocol address, and the generating may comprise translating the first Internet Protocol address to data indicating a location, determining a semantic classification of the indicated location, transforming the data indicating a location to an indicator using a bijective function, the indicator belonging to a range of indicators of the determined semantic classification, encrypting the indicator using format preserving encryption, and transforming the encrypted indicator to a second Internet Protocol address using an inverse bijective function, wherein the semantic classification of the indicated location is preserved in the second Internet Protocol address. A plurality of semantic classifications of the indicated location may be preserved by encrypting categories of determined semantic classifications using a range of indicators corresponding to each semantic classification. When a set of values indicating a set of locations and a set of possible values of indicators are not equal in size, the bijective function is applied to subsets of equal sizes.

In embodiments, the received location data may comprise first Global Positioning System coordinates, and the generating may comprise determining a semantic classification of the Global Positioning System coordinates, transforming the Global Positioning System coordinates to an indicator using a bijective function, the indicator belonging to a range of indicators of the determined semantic classification, encrypting the indicator using format preserving encryption, and transforming the encrypted integer to second Global Positioning System coordinates using an inverse bijective function, wherein the semantic classification of the first Global Positioning System coordinates is preserved in the second Global Positioning System coordinates. A plurality of semantic classifications of the first Global Positioning System coordinates may be preserved by encrypting categories of determined semantic classifications using a range of indicators corresponding to each semantic classification. When a set of values indicating a set of locations and a set of possible values of indicators are not equal in size, the bijective function is applied to subsets of equal sizes.

In an embodiment, a system for encrypting data may comprise a processor, memory accessible by the processor, and computer program instructions stored in the memory and executable by the processor to perform receiving location data and generating encrypted data from the received location data, wherein the encrypted data preserves the format and semantics of the received location data.

In an embodiment, a computer program product for encrypting data may comprise a non-transitory computer readable storage having program instructions embodied therewith, the program instructions executable by a computer, to cause the computer to perform a method comprising receiving location data and generating encrypted data from the received location data, wherein the encrypted data preserves the format and semantics of the received location data.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide techniques for encryption of location information, while preserving a format and semantics of the information. For example, for location information, such as location derived from IP addresses, a database that maps IP address ranges to physical locations and a semantic criterion may be used to cluster different ranges and classify them according to the semantic criterion. Once classified, a bijective function may map ranges within a class to a range of indicators, such as an integer range. Then Format Preserving Encryption (FPE) techniques may be used to encrypt the data. Using the inverse of the bijective function, an IP address may be generated that retains the semantic characteristics while providing the anonymity level requested by the user. Such techniques may provide systems that rely on IP-to-Location translation functions a valid and anonymized database.

For GPS coordinates the process may be similar. First, different regions may be classified using a semantic classification, such as population density ranges, temperature ranges, elevation, etc. Second, the coordinates may be transformed using a bijective function to a range of indicators, such as an integer range. Then Format Preserving Encryption (FPE) techniques may be used to encrypt the data. Using the inverse of the bijective function, GPS coordinates may be generated that retain the semantic characteristics while providing the anonymity level requested by the user.

Figure 1:
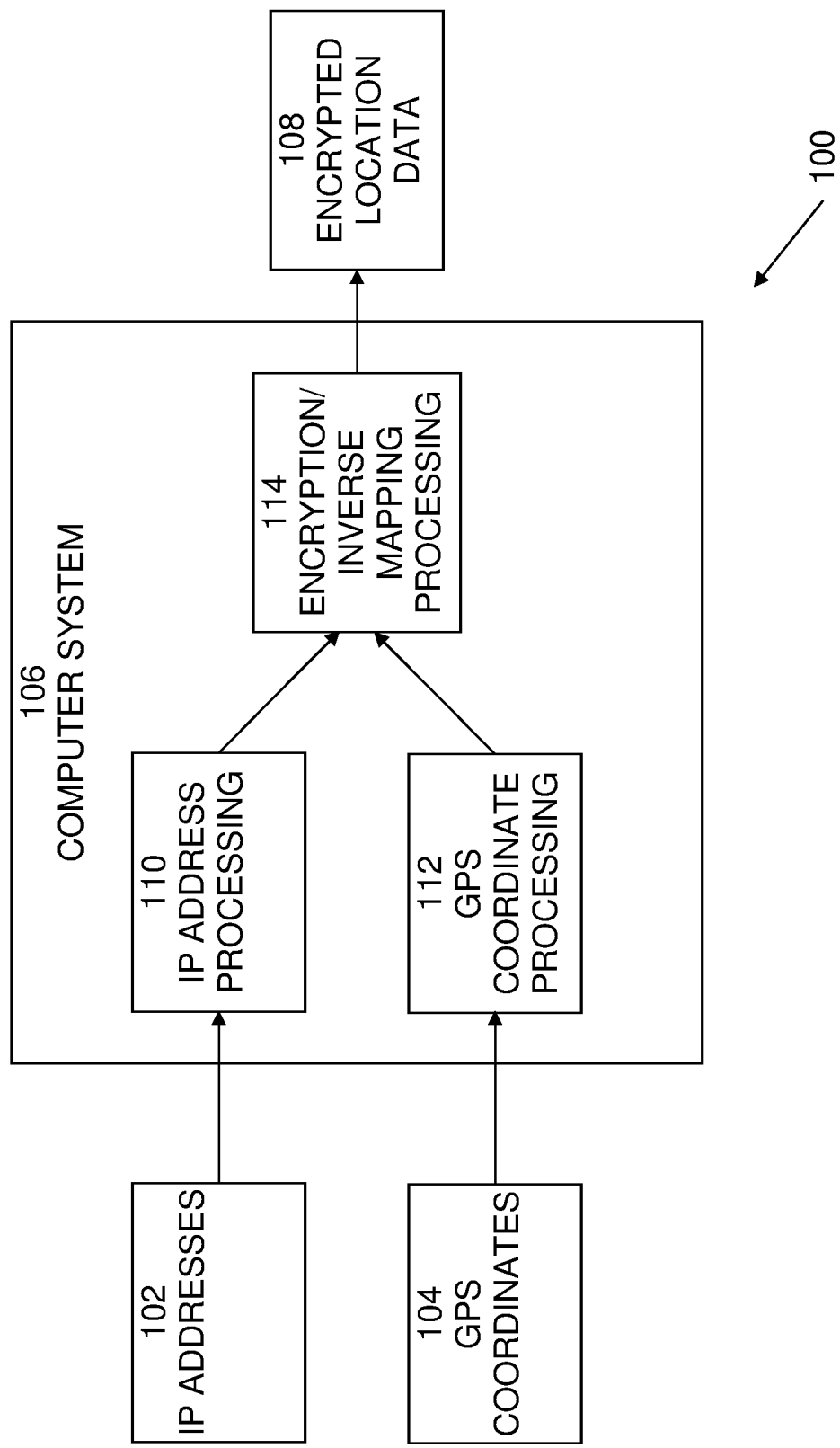
FIG. 1 illustrates an exemplary system in which embodiments of the present systems and methods may be implemented.

An exemplary system 100 in which the present systems and methods may be implemented is shown in FIG. 1. In this example, system 100 includes data sources, such as Internet Protocol (IP) address data sources 102, Global Positioning System (GPS) coordinates data sources 104, computer system 106, and encrypted location data 108. IP address data sources 102 may include one or more devices and/or processes that communicate using Internet Protocol networks, and for which a physical, logical, and/or network location may be determined. Typically, IP addresses are assigned based on a number of factors, such as the Internet Service Provider making the assignment, and to some extent, on the physical location of the device receiving the assignment. Accordingly, location information may be derived from an IP address. GPS coordinates data sources 104 may include one or more devices and/or processes that determine the physical locations of themselves or of other devices, processes, and/or users using the Global Positioning System. Although IP address data sources 102 and GPS coordinates data sources 104 are described here, these are merely examples. The present systems and methods are applicable to any physical, logical, and/or network location data regardless of how it is generated, by whom it is generated, by what processes it is generated, or what protocols or formats are used to generate or communicate it.

Computer system 106 may include one or more data processing systems that may receive data from, for example, IP address data sources 102 and GPS coordinates data sources 104 and process that data in accordance with embodiments of the present techniques. For example, IP address data from IP address data sources 102 may be processed by IP address processing 110 and GPS coordinates data from GPS coordinates data sources 104 may be processed by GPS coordinates processing 112. The processed data from IP address processing 110 and GPS coordinates processing 112 may be encrypted and inverse mapped by encryption/inverse mapping processing 114 to form encrypted location data 108, which may be output from computer system 106.

Figure 2:
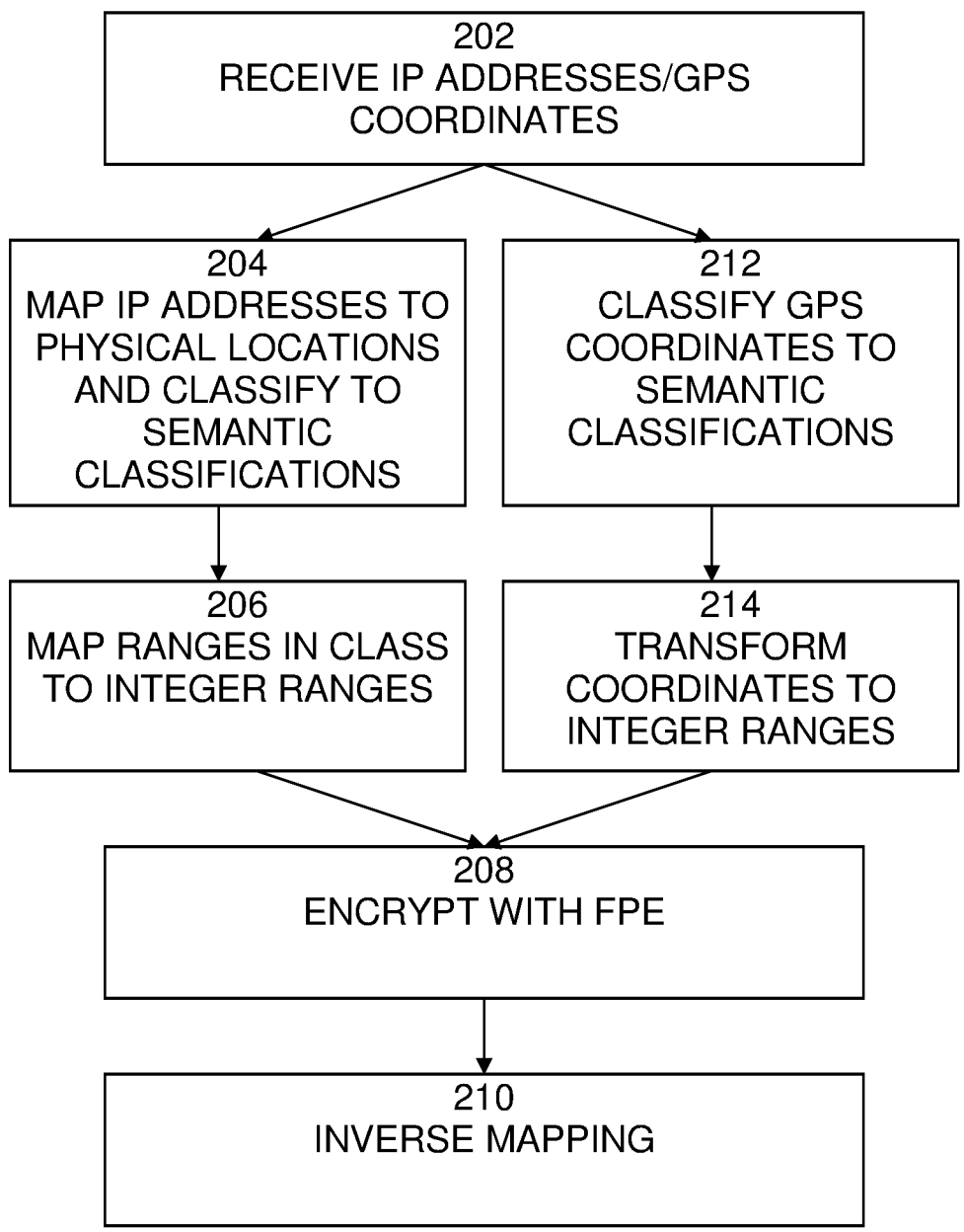
FIG. 2 is an exemplary data flow diagram of a process according to embodiments of the present systems and methods.

FIG. 2 is an exemplary flow diagram of a process 200 which may be implemented in the system of FIG. 1. It is best viewed in conjunction with FIG. 1. In this example, the indicators that are described are integers. However, this is merely an example. The present systems and methods may utilize any type of indicators capable of uniquely identifying instances and having ranges or domains of values. Process 200 begins with 202, in which IP addresses and/or GPS coordinates may be received for, for example, IP address data sources 102 and GPS coordinates data sources 104. For IP addresses, process 200 may continue with 204, in which the IP addresses may be mapped to physical locations and may be classified to semantic classifications. For example, a translation database may map IP address ranges to physical locations and a semantic criterion may be used to cluster different ranges and classify them according to the semantic criterion. The translation database may include an anonymity parameter. The physical locations and semantic classifications may be used to tile a map. For example, the map may be divided into disjoint "tiles" that together cover the map. The tiling process may be radius-based, based on a distance from a defined location. The tiling process may also depend on other geographical/semantical characteristics. For example, all islands may be clustered as a single tile, as may all cities within a certain population range, all locations in a certain height range, etc.

At 206, for each tile, a bijective function defining a one-to-one mapping may be constructed to translate each IP address into an integer, so that the resulting integers for every tile form a contiguous range. Given an IP address, the address may be translated to physical coordinates and the tile it belongs to may be identified.

At 208, an integer format preserving encryption process may be employed (using the range boundaries of the tile) over the result of the bijective function for the given IP address. At 210, the inverse of the bijective function may be used over the encrypted result to obtain a new IP address representing the encryption result.

For GPS coordinates process 200 may continue with 212, in which the GPS coordinates may be classified semantically. For example, different regions may be classified using a semantic classification, such as population density ranges, temperature ranges, elevation, etc. A semantic criterion may be used to cluster different GPS coordinates and classify them according to the semantic criterion. The semantic classifications may be used to tile a map. For example, the map may be divided into disjoint "tiles" that together cover the map. The tiling process may depend on other geographical/semantical characteristics. For example, all islands may be clustered as a single tile, as may all cities within a certain population range, all locations in a certain height range, etc.

At 214, for each tile, a bijective function defining a one-to-one mapping may be constructed to translate each GPS coordinate into an integer, so that the resulting integers for every tile form a contiguous range. Given a GPS coordinate, the coordinate may be translated to a semantic classification and the tile it belongs to may be identified. Thus, the coordinates may be transformed to an integer range using a bijective function specific to their classification. At 208, an integer format preserving encryption process may be employed over the result of the bijective function for the given GPS coordinates. At 210, the inverse of the bijective function may be used over the encrypted result to obtain a new set of real world coordinates with the same semantic classification as before, which represent the encryption result.

An example of the use of the above-described process is as follows: assume address X is mapped bijectively to address f(X). A pollution control center may analyze data for these addresses and come to the conclusion that some addresses need to be alerted. The alerts would be sent to an authorized authority (say the city council) that will decrypt f(X) back to X and alert the inhabitants. Accordingly, the capability is provided for authorized parties to reverse the mapping if necessary However, this bijectiveness may cause a problem when map sets of different sizes, for example, IP addresses in NYC to IP addresses in Chicago. In embodiments, this issued may be handled by, for example, mapping the smaller set (say the Chicago addresses) to a subset of equal size from the larger set (say the NYC addresses). Thus, not all the values in the larger set are mapped. This is not a problem for the use-cases where only small subsets of the categories need to be mapped, for example, only IP addresses of current customers.

In embodiments, to accommodate more than one semantic classification, a construct termed the 'Categorical Tile' may be used. While the integer format preserving encryption process essentially permutes the locations within a certain tile, more classifications may be integrated by encrypting the tile number, thus permuting the tiles within a larger classification context. For example, each category of classification may utilize a different integer range. Accordingly, more than one location semantic, such as region population size, mean region temperature, etc., may be preserved. In embodiments, the permutation may be contingent on the fact that all permuted tiles share the same integer range size. In embodiments, the tiles may be divided and the ranges correspondingly decreased until all permuted tiles share the same integer range size. In embodiments, the tiles may be defined as a Cartesian multiplication of all semantics. These embodiments do not require tile-integer-ranges to be equal.

Figure 3:
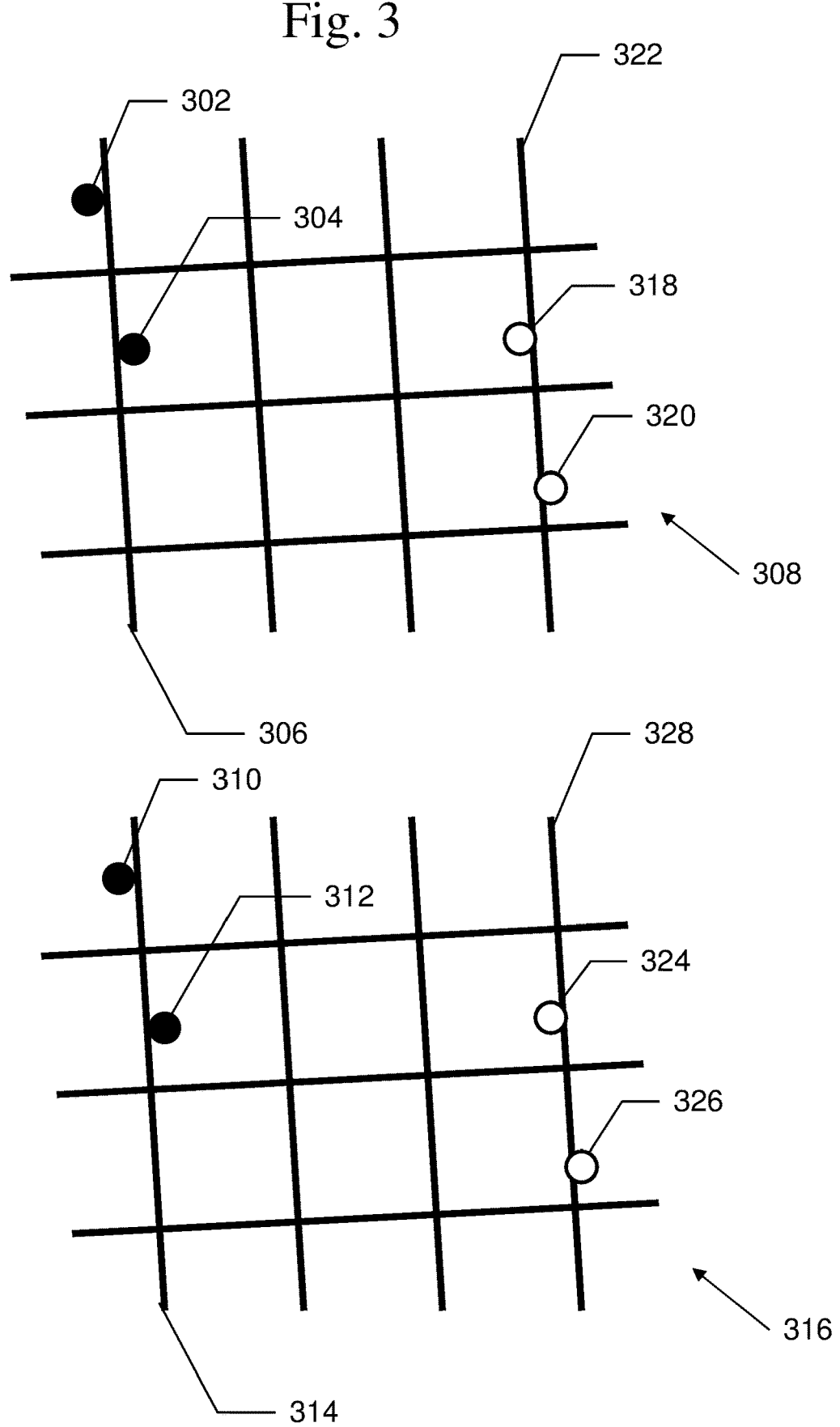
FIG. 3 is an exemplary illustration of encryption according to embodiments of the present systems and methods.

In embodiments, cluster semantics may be preserved, as well as properties clusters being preserved after encryption. An example of such semantic preservation is shown in FIG. 3. In this example, locations 302, 304 originally share a street 306 in city 308. Locations 302, 304 may be encrypted as new locations. In embodiments, semantic preservation means that, when encrypted, the new locations may be locations 310, 312, which may continue sharing a street 314 in a different city 316. In embodiments, locations within the same street may be mapped to the same tile. After the format-preserving-encryption is applied, these locations may encrypt to different locations within the very same tile (street). If another semantic is to be preserved, or another level of anonymity is required, it may be handled by the Categorical Tile. For example, defining the different streets within a city as belonging to the same categorical tile, embodiments may permute the streets and transform locations sharing a street to another different street, such as locations 318, 320 on street 322, or locations 324, 326 on street 328.

Figure 4:
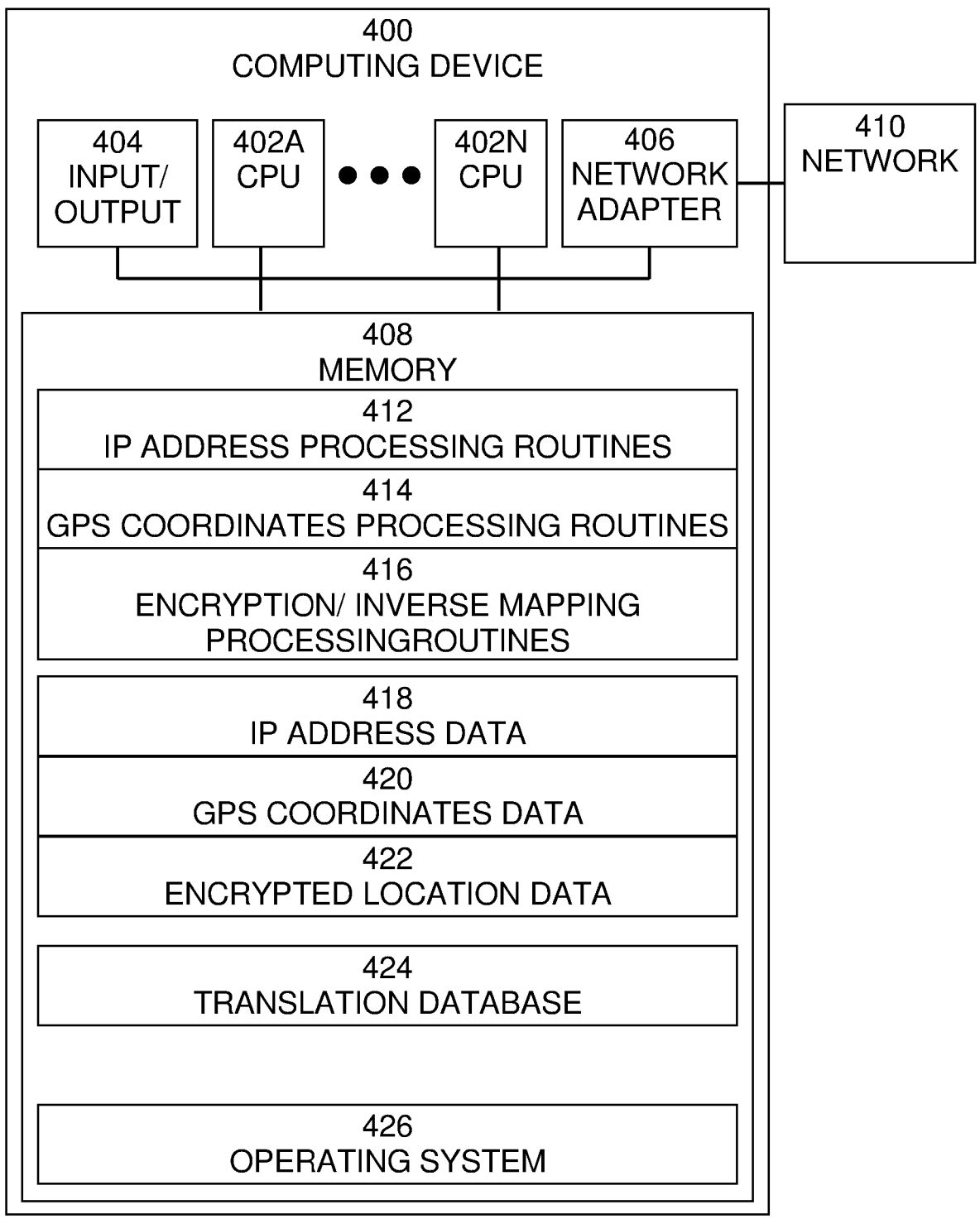
FIG. 4 is an exemplary block diagram of a computer system in which embodiments of the present systems and methods may be implemented.

An exemplary block diagram of a computer system 402, in which processes involved in the embodiments described herein may be implemented, is shown in FIG. 4. Computer system 402 may be implemented using one or more programmed general-purpose computer systems, such as embedded processors, systems on a chip, personal computers, workstations, server systems, and minicomputers or mainframe computers, or in distributed, networked computing environments. Computer system 402 may include one or more processors (CPUs) 402A-402N, input/output circuitry 404, network adapter 406, and memory 408. CPUs 402A-402N execute program instructions in order to carry out the functions of the present communications systems and methods. Typically, CPUs 402A-402N are one or more microprocessors, such as an INTEL CORE® processor. FIG. 4 illustrates an embodiment in which computer system 402 is implemented as a single multi-processor computer system, in which multiple processors 402A-402N share system resources, such as memory 408, input/output circuitry 404, and network adapter 406. However, the present communications systems and methods also include embodiments in which computer system 402 is implemented as a plurality of networked computer systems, which may be single-processor computer systems, multi-processor computer systems, or a mix thereof.

Input/output circuitry 404 provides the capability to input data to, or output data from, computer system 402. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 402. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 402 is programmed to perform. In the example shown in FIG. 4, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 4, memory 408 may include IP address processing routines 412, GPS coordinates processing routines 414, encryption/inverse mapping processing routines 416, IP address data 418, GPS coordinates data 420, encrypted location data 422, translation database 424, and operating system 426. IP address processing routines 412 may include software routines to receive and process IP address data 418 using translation database 424. IP address data 418 may be received, for example, from IP address data sources 102, shown in FIG. 1. GPS coordinates processing routines 414 may include software routines to receive and process GPS coordinates data 420 using translation database 424. GPS coordinates data 420 may be received, for example, from GPS coordinates data sources 104, shown in FIG. 1. Encryption/inverse mapping processing routines 416 may include software routines to encrypt and inverse map the output from IP address processing routines 412 and GPS coordinates processing routines 414 to form encrypted location data 422. Matrix generation routines 418 may include software routines to generate matrices in which the rows and columns represent drugs and each cell represents the similarity measure. Model generation routines 420 may include software routines to generate models, such as logistic regression models. Hypothesis generation routines 422 may include software routines to generate drug repositioning hypotheses using the models. Operating system 424 may provide overall system functionality.

As shown in FIG. 4, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for encrypting data, the method comprising:
   obtaining, at a computer system comprising a processor, memory accessible by the processor, and computer program instructions stored in the memory and executable by the processor to perform the method, data indicating a location data from a data source system comprising a physical device having a physical location;
   determining, at the computer system, a semantic classification of the indicated location;
   transforming, at the computer system, the data indicating a location to an indicator using a bijective function, the indicator belonging to a range of indicators of the determined semantic classification;
   encrypting, at the computer system, the indicator using format preserving encryption; and
   transforming, at the computer system, the encrypted indicator to a second indicator using an inverse bijective function, wherein the semantic classification of the indicated location is preserved in the second indicator; and
   generating, at the computer system, encrypted data from the received location data, wherein the encrypted data preserves the format and semantics of the received data indicating a location.

2. The method of claim 1, wherein the received data indicating a location comprises a first Internet Protocol address, and the generating comprises:
   mapping, at the computer system, the first Internet Protocol address to a physical location;
   classifying, at the computer system, the physical location to at least one semantic classification using a translation database and using a semantic criterion to cluster different ranges of Internet Protocol addresses and classify the Internet Protocol addresses according to the semantic criterion to within a range of the semantic criterion, wherein the translation database includes an anonymizing parameter; and
   transforming, at the computer system, the encrypted indicator to a second Internet Protocol address using an inverse bijective function, wherein the semantic classification of the indicated location is preserved in the second Internet Protocol address.

3. The method of claim 2, wherein a plurality of semantic classifications of the indicated location are preserved by encrypting categories of determined semantic classifications using a range of indicators corresponding to each semantic classification.

4. The method of claim 3, wherein when a set of values indicating a set of locations and a set of possible values of indicators are not equal in size, the bijective function is applied to subsets of equal sizes.

5. The method of claim 1, wherein the received data indicating a location comprises first Global Positioning System coordinates, and the transforming comprises:
   classifying, at the computer system, a physical location indicated by the first Global Positioning System coordinates to at least one semantic classification using a semantic criterion to cluster different Global Positioning System coordinates and classify the Global Positioning System coordinates according to the semantic criterion to within a range of the semantic criterion; and
   transforming, at the computer system, the encrypted indicator to second Global Positioning System coordinates using an inverse bijective function, wherein the semantic classification of the first Global Positioning System coordinates is preserved in the second Global Positioning System coordinates.

6. The method of claim 5, wherein a plurality of semantic classifications of the first Global Positioning System coordinates are preserved by encrypting categories of determined semantic classifications using a range of indicators corresponding to each semantic classification.

7. The method of claim 6, wherein when a set of values indicating a set of locations and a set of possible values of indicators are not equal in size, the bijective function is applied to subsets of equal sizes.

8. A system for encrypting data, the system comprising a processor, memory accessible by the processor, and computer program instructions stored in the memory and executable by the processor to perform:
   obtaining, at the system, data indicating a location from a data source system comprising a physical device having a physical location;
   determining, at the system, a semantic classification of the indicated location;
   transforming, at the system, the data indicating a location to an indicator using a bijective function, the indicator belonging to a range of indicators of the determined semantic classification;
   encrypting, at the system, the indicator using format preserving encryption; and
   transforming, at the system, the encrypted indicator to a second indicator using an inverse bijective function, wherein the semantic classification of the indicated location is preserved in the second indicator; and generating, at the system, encrypted data from the received location data, wherein the encrypted data preserves the format and semantics of the received data indicating a location.

9. The system of claim 8, wherein the received data indicating a location comprises a first Internet Protocol address, and the generating comprises:

mapping, at the system, the first Internet Protocol address to a physical location;

classifying, at the system, the physical location to at least one semantic classification using a translation database and using a semantic criterion to cluster different ranges of Internet Protocol addresses and classify the Internet Protocol addresses according to the semantic criterion to within a range of the semantic criterion, wherein the translation database includes an anonymizing parameter; and transforming, at the system, the encrypted indicator to a second Internet Protocol address using an inverse bijective function, wherein the semantic classification of the indicated location is preserved in the second Internet Protocol address.

10. The system of claim 9, wherein a plurality of semantic classifications of the indicated location are preserved by encrypting categories of determined semantic classifications using a range of indicators corresponding to each semantic classification.

11. The system of claim 10, wherein when a set of values indicating a set of locations and a set of possible values of indicators are not equal in size, the bijective function is applied to subsets of equal sizes.

12. The system of claim 8, wherein the received data indicating a location comprises first Global Positioning System coordinates, and the transforming comprises:

classifying, at the system, a physical location indicated by the first Global Positioning System coordinates to at least one semantic classification using a semantic criterion to cluster different Global Positioning System coordinates and classify the Global Positioning System coordinates according to the semantic criterion to within a range of the semantic criterion; and transforming, at the system, the encrypted indicator to second Global Positioning System coordinates using an inverse bijective function, wherein the semantic classification of the first Global Positioning System coordinates is preserved in the second Global Positioning System coordinates.

13. The system of claim 12, wherein a plurality of semantic classifications of the first Global Positioning System coordinates are preserved by encrypting categories of determined semantic classifications using a range of indicators corresponding to each semantic classification.

14. The method of claim 13, wherein when a set of values indicating a set of locations and a set of possible values of indicators are not equal in size, the bijective function is applied to subsets of equal sizes.

15. A computer program product for encrypting data, the computer program product comprising a non-transitory computer readable storage having program instructions embodied therewith, the program instructions executable by a computer, to cause the computer to perform a method comprising:

obtaining, at the computer system comprising a processor, memory accessible by the processor, and computer program instructions stored in the memory and executable by the processor to perform the method, data indicating a location from a data source system comprising a physical device having a physical location;

determining, at the computer system, a semantic classification of the indicated location;

transforming, at the computer system, the data indicating a location to an indicator using a bijective function, the indicator belonging to a range of indicators of the determined semantic classification;

encrypting, at the computer system, the indicator using format preserving encryption; and transforming, at the computer system, the encrypted indicator to a second indicator using an inverse bijective function, wherein the semantic classification of the indicated location is preserved in the second indicator; and generating, at the computer system, encrypted data from the received location data, wherein the encrypted data preserves the format and semantics of the received data indicating a location.

16. The computer program product of claim 15, wherein the received data indicating a location comprises a first Internet Protocol address, and the generating comprises:

mapping, at the computer system, the first Internet Protocol address to a physical location;

classifying, at the computer system, the physical location to at least one semantic classification using a translation database and using a semantic criterion to cluster different ranges of Internet Protocol addresses and classify the Internet Protocol addresses according to the semantic criterion to within a range of the semantic criterion, wherein the translation database includes an anonymizing parameter; and transforming, at the computer system, the encrypted indicator to a second Internet Protocol address using an inverse bijective function, wherein the semantic classification of the indicated location is preserved in the second Internet Protocol address.

17. The computer program product of claim 16, wherein a plurality of semantic classifications of the indicated location are preserved by encrypting categories of determined semantic classifications using a range of indicators corresponding to each semantic classification.

18. The computer program product of claim 17, wherein when a set of values indicating a set of locations and a set of possible values of indicators are not equal in size, the bijective function is applied to subsets of equal sizes.

19. The computer program product of claim 15, wherein the received data indicating a location comprises first Global Positioning System coordinates, and the transforming comprises:

classifying, at the computer system, a physical location indicated by the first Global Positioning System coordinates to at least one semantic classification using a semantic criterion to cluster different Global Positioning System coordinates and classify the Global Positioning System coordinates according to the semantic criterion to within a range of the semantic criterion; and transforming, at the computer system, the encrypted indicator to second Global Positioning System coordinates using an inverse bijective function, wherein the semantic classification of the first Global Positioning System coordinates is preserved in the second Global Positioning System coordinates.

20. The computer program product of claim 19, wherein a plurality of semantic classifications of the first Global Positioning System coordinates are preserved by encrypting categories of determined semantic classifications using a range of indicators corresponding to each semantic classification, and wherein the indicator is an integer.

* * * * *